(12) United States Patent
Mirzendehdel et al.

(10) Patent No.: US 11,577,321 B2
(45) Date of Patent: Feb. 14, 2023

(54) HYBRID MANUFACTURING SYSTEM AND METHOD THAT REDUCES INACCESSIBLE SUPPORT STRUCTURES

(71) Applicant: Palo Alto Research Center Incorporated, Palo Alto, CA (US)

(72) Inventors: Amirmassoud Mirzendehdel, San Mateo, CA (US); Morad Behandish, Mountain View, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 123 days.

(21) Appl. No.: 17/129,765

(22) Filed: Dec. 21, 2020

(65) Prior Publication Data

US 2022/0193774 A1    Jun. 23, 2022

(51) Int. Cl.

| | |
|---|---|
| *B22F 10/40* | (2021.01) |
| *B22F 10/38* | (2021.01) |
| *B33Y 10/00* | (2015.01) |
| *B33Y 30/00* | (2015.01) |
| *B22F 10/85* | (2021.01) |
| *B22F 10/28* | (2021.01) |
| *B33Y 50/02* | (2015.01) |

(52) U.S. Cl.
CPC .............. *B22F 10/40* (2021.01); *B22F 10/28* (2021.01); *B22F 10/385* (2021.01); *B22F 10/85* (2021.01); *B22F 2203/00* (2013.01); *B33Y 10/00* (2014.12); *B33Y 30/00* (2014.12); *B33Y 50/02* (2014.12)

(58) Field of Classification Search
CPC ........ B22F 10/40; B22F 10/28; B22F 10/385; B22F 10/85; B22F 2203/00; B33Y 10/00; B33Y 30/00; B33Y 50/02; G05B 2219/49016; G05B 19/4099
See application file for complete search history.

(56) References Cited

U.S. PATENT DOCUMENTS

| | | | |
|---|---|---|---|
| 10,359,764 B1 * | 7/2019 | Nelaturi | B33Y 50/02 |
| 11,283,143 B2 * | 3/2022 | Aston | B22F 5/10 |
| 2002/0147521 A1 * | 10/2002 | Mok | G05B 19/4099 |
| | | | 700/118 |
| 2019/0204807 A1 * | 7/2019 | Nelaturi | B33Y 50/00 |

(Continued)

OTHER PUBLICATIONS

Das et al., "Optimum Part Build Orientation in Additive Manufacturing for Minimizing Part Errors and Support Structures", 43rd Proceedings of the North American Manufacturing Research Institution of SME, vol. 1, 2015, pp. 343-354.

(Continued)

*Primary Examiner* — Lawrence Averick
(74) *Attorney, Agent, or Firm* — Mueting Raasch Group

(57) ABSTRACT

A geometry model is defined of a part targeted for a manufacturing operation that includes an additive process followed by a subtractive process. Potential build orientations of the geometry model used in the additive processes are defined, as are one or more removal tools of the subtractive process. For each of the potential build orientations, supports that are used by the additive process at the orientation are determined. One of the build orientations is selected that minimizes portions of one of the supports that are inaccessible via at least one of the removal tools.

16 Claims, 11 Drawing Sheets

(56) References Cited

U.S. PATENT DOCUMENTS

| | | | | |
|---|---|---|---|---|
| 2020/0316856 | A1* | 10/2020 | Mojdeh | B29C 71/04 |
| 2020/0373642 | A1* | 11/2020 | Aston | B22F 10/20 |
| 2021/0390229 | A1* | 12/2021 | Mirzendehdel | B33Y 50/02 |

OTHER PUBLICATIONS

Mirzendehdel et al., "Topology Optimization with Accessibility Constraint for Multi-Axis Machining", Computer-Aided Design, 122, 2020, 9 pages.

Morgan et al., "Part Orientation Optimisation for the Additive Layer Manufacture of Metal Components", The International Journal of Advanced Manufacturing Technology, 86, 5-8, 2016, pp. 1679-1687.

Nezhad et al., "Pareto-Based Optimization of Part Orientation in Stereolithography", Proceedings of the Institution of Mechanical Engineers, Part B: Journal of Engineering Manufacture, 224, 10, 2010, pp. 1591-1598.

Umetani et al., "Cross-Sectional Structural Analysis for 3D Printing Optimization", SIGGRAPH Asia Technical Briefs, 2013, 1 page.

Morris et al., "A Subtractive Manufacturing Constraint for Level Set Topology Optimization," Arxiv.Org, Cornell University Library, 201 Olin Library Cornell University Ithaca, NY 14853, Feb. 19, 2020: 24 pgs.

Nelatur et al., "Automatic Support Removal for Additive Manufacturing Post Processing," Arxiv.Org, Cornell University Library, 201 Olin Library Cornell University Ithaca, NY 14853; Apr. 27, 2019; 14 pgs.

Vanek, J., Clever Support: Efficient Support Structure Generation for digital Fabrication—Vanek-2014-Computer Graphics Forum, Wiley Online Library, Retrieved from the Internet: URL:https://inlinelibrary.wiley.com/doi/10.1111/cgf.12437 [retrieved on May 6, 2022]: 17 pgs.

European Patent Office Search Report; dated May 17, 2022; 9 pgs.

Delfs et al., "Optimized Build Orientation of Additive Manufactured Parts for Improved Surface Quality and Build Time", Additive Manufacturing 12, 2016, pp. 314-330.

Pandey et al., "Optimal Part Deposition Orientation in FDM by Using Multicriteria Genetic Algorithm", International Journal of Production Research, 42, 19, 2004, pp. 4069-4089.

Paul et al., "Optimization of Layered Manufacturing Process for Reducing Form Errors with Minimal Support Structures", Journal of Manufacturing Systems, 36, 2015, pp. 231-243.

Zhao et al., "Determination of Optimal Build Orientation Based on Satisfactory Degree Theory for RPT", Ninth International Conference on Computer Aided Design and Computer Graphics, IEEE, 2005, 6 pages.

\* cited by examiner

HYBRID MANUFACTURING SYSTEM AND METHOD THAT REDUCES INACCESSIBLE SUPPORT STRUCTURES

STATEMENT REGARDING FEDERALLY SPONSORED RESEARCH OR DEVELOPMENT

This invention was made with government support under contract number G011.3809.00 awarded by Defense Advanced Research Projects Agency (DARPA). The government has certain rights in the invention.

SUMMARY

Embodiments described herein include a hybrid manufacturing system that reduces inaccessible support structures. In one embodiment, a model of a part is defined, the part targeted for a manufacturing operation that includes an additive process followed by a subtractive process. A plurality of potential build orientations of the additive process are defined, as are one or more removal tools of the subtractive process. For each orientation of the plurality of potential build orientations, support structures that are used by the additive process at the orientation is determined. One of the plurality of potential build orientations with minimal cost of inaccessible portions of the support structures by the set of subtractive tools is selected. The selected build orientation is used to build the part using the additive process and at least one tool in the set of tools for the subtractive process.

In another embodiment, a manufacturing operation is defined that includes an additive process followed by a subtractive process. The subtractive process uses a removal tool. A model of a part targeted for the manufacturing operation is determined. The manufacturing process is modeled for a plurality of potential build orientations of the additive process. For each orientation of the plurality of potential build orientations, supports are determined that are used by the additive process at the orientation. One of the plurality of potential build orientations is selected that reduces a cost of inaccessible portions of the support structures. The selected build orientation is used to build the part using the additive process.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
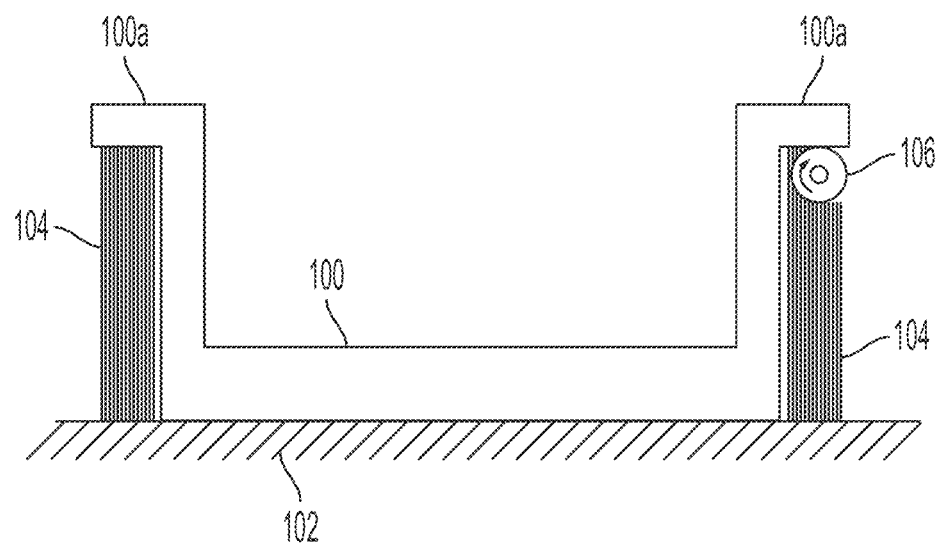
FIG. 1 is a diagram showing aspects of hybrid manufacturing according to an example embodiment.

The present disclosure relates to hybrid manufacturing process planning. Hybrid manufacturing relates to a process of manufacturing that combines two different process types usually performed on distinctly different machines, such as additive manufacturing (AM), subtractive manufacturing (SM), welding, deformation/bending, etc. Additive manufacturing includes such processes as fused deposition modeling, stereo-lithography, selective laser sintering, etc., and is colloquially referred to as 3-D printing. Additive manufacturing is capable of forming complex structures with customized material gradation, such as complex and efficient infill structures. Subtractive manufacturing is useful for producing high-precision mechanical parts. Although AM affords wide freedom in customizing the internal structures of parts, SM can achieve finer precision and surface quality specifications than currently possible with AM, such as needed for functional interfaces requiring high-tolerance fit and assembly.

Historically, the manufacturing of parts from raw stock or material has involved these two distinct, albeit combinable, manufacturing processes. Fabricating a part through SM involves progressively removing or machining material from raw stock until the part has been reduced to the desired form within a specified tolerance. Raw material is often removed by turning, drilling, or milling. Fabricating a part through AM involves progressively adding or depositing material onto a part being fabricated, often by adding successive layers, until the part approximates an intended shape and size, such as used with three-dimensional printing through fused deposition modeling (FDM).

For instance, metal AM is sometimes used in lieu of traditional metalworking, such as casting, but with more freedom in generating complex forms, to produce a near-net shape that is close enough to the final part. Functional interfaces may still be finished using SM to satisfy tolerancing and surface quality specifications. In many cases, in layer-by-layer AM processes such as FDM, support materials are printed into the lower layers of the near-net shape, allowing the upper layers to extend beyond the lower layers' width without sagging due to gravity. This may require SM post-processing to remove the support materials.

Embodiments described herein include a method and system for automated optimization of the build orientation in additive manufacturing based on support structure accessibility. This is a systematic approach to automated build orientation optimization while ensuring removability of sacrificial support structures through subtractive processes (e.g., milling) in terms of 'accessibility' of every point of support given a 'set' of cutting tool assemblies, fixturing orientations, and substrate without imposing any artificial constraints on geometric complexity of part, support geometry, machining tools, and fixturing devices. The approach enables efficient and effective design space exploration by finding optimal build orientation for which its 'near-net' shape (part+supports) can be fabricated using additive manufacturing and post-processed using well-established subtractive machines.

As noted above, AM technologies are capable of fabricating geometrically complex parts by adding material layer-by-layer. The growing interest in AM, specifically metal-AM, stems from its ability to leverage geometric complexity to design high-performance light-weight designs for applications in aerospace, automotive, medical, etc. However, in most of metal-AM technologies such as powder-bed fusion, sacrificial support structures are needed in 'overhanging' regions to dissipate excessive heat and ensure successful build of the near-net shape (part+support). The overhanging regions are often specified in terms of an overhang angle, which is a measure of the maximum amount that one layer can extend beyond the layer on which it is deposited without requiring a support. For example, if deposition process extrudes a material that is about 1 mm in diameter, and overhang angle of 45° would allow a layer to extend about 1 mm beyond the layer below without requiring a support structure underneath. Since the support structure is typically removed using an SM process such as milling, the supports need be 'accessible' by the available machining tools and fixtures.

A simplified diagram of an AM part with support structures is shown in the diagram of FIG. 1. An AM manufactured part 100 is built on a fixture 102. To ensure the top flanges 100a are built to the proper shape, supports 104 are built together with the part 100. After the AM process is complete, a removal tool 106 is used to remove the supports 104. The removal tool 106 may include any combination of tools that cut, grind, sand, burnish, slice, carve, etc., and any reference herein to "cutting" or "cutting tools" herein may apply equally to any of these removal tool types. Also note that the terms "tool" and "tool assembly" may be used interchangeably herein, as a tool may include non cutting components (e.g., chucks, bearings, etc.) that could limit regions that the tool can be used. Note that the removal tool 106 may be oriented differently than shown here in order to leave the lower portion of the flanges 100a smooth.

There are numerous published works on build orientation optimization considering overall support volume, build time, surface quality, volumetric error, and mechanical strength. However, to the best of our knowledge, there is no systematic approach to optimizing build orientation based on support accessibility for general set of tool assemblies, fixtures, and support types.

Subtractive manufacturing techniques such as multi-axis machining have been widely used for manufacturing high-quality re-producible parts across multiple industries including aerospace and automotive. In SM, one begins with a raw stock of material and gradually carve out material until the desired shape emerges. In a hybrid model, an AM process is first used to obtain a near-net shape, and temporary supports may have been added to obtain this shape. The SM process is used at least to remove the supports, and may also be used to bring certain regions of the near-net shape to a final dimensional tolerance, e.g., precision machining of mounting interfaces.

An accessibility analysis can be used for imposing support accessibility constraint through multi-axis machining; for more details see Amir M. Mirzendehdel, Morad Behandish, and Saigopal Nelaturi—"Topology optimization with accessibility constraint for multi-axis machining," *Computer Aided Design,* 122 (May, 2020), 102825. Let us assume that a tool assembly, T, can operate with all six degrees of freedom (three translations and three rotations) available for a rigid body, where $T=(H \cup K)$, and where H and K are the holder and the cutter, respectively. Let us also denote the part as $\Omega$, the substrate (and other fixtures) as F, and support structures as S.

Mathematically the configuration space of rigid motions is represented as $C=\mathbb{R}^3 \times SO(3)$; SO(3) refers to the group of 3×3 orthogonal transformations that represent spatial rotations. We define the inaccessibility measure field (IMF) over the 3D design domain $f_{IMF}: \mathbb{R}^3 \to \mathbb{R}$ for each given removal tool assembly T as the pointwise minimum of shifted convolutions for different choices of sharp points and available tool orientations $\Theta \subseteq SO(3)$ (which depends on T):

$$f_{IMF}(x; O, T, K) = \min_{R \in \Theta} \min_{k \in K} vol[O \cap (R, x)(T-k)] \quad (1)$$

where point $x \in \mathcal{N}_0$, with $\mathcal{N}_0 = \Omega_0 \cup S$ denoting the near-net shape fabricated of the design domain $\Omega_0$ and its corresponding support structures S. and obstacle $O = \Omega_0 \cup F$. There are two independent transformations in effect: 1) The shift $T \to (T-k)$ in Equation (1) is to try different ways to register the translation space with the design domain, by changing the local coordinate system to bring different sharp points to the origin; 2) The rotation $(T-k) \to (RT-Rk)$ followed by translation $(RT-Rk) \to (RT-Rk)+x$ bring the candidate sharp point (new origin) to the query point $x \in \mathcal{N}_0$.

The same effect can be obtained by querying the convolution at $t:=(x-Rk)$ so that the rigid transformation (R, t) brings the sharp point in contact with the query point: (R, t)k=Rk+t=Rk+(x-Rk)=x, as expected. The IMF is thus computed as follows:

$$f_{IMF}(x; O, T, K) = \min_{R \in \Theta_{tool}} \min_{k \in K} vol[O \cap (1_O * \tilde{1}_{RT})(x-Rk)] \quad (2)$$

Generally, the IMF is a continuous spatial field that quantifies to what extent different points in a design domain cannot be accessed by the set of one or more tools for the subtractive process. Equation (1) can be further extended to consider multiple removal tools. This may include separate removal machines, as well as a single machine with multiple exchangeable parts, e.g., different size/shape cutting heads. Given $n_T \geq 1$ available tool assemblies $T_i = (H_i \cup K_i)$ for $1 \leq i \leq n_T$, we compute their combined IMF as in Equation (3) below by applying another minimum operation over different tools to identify the tool(s) with the smallest volumetric interference at available orientations and sharp points, in which $f_{IMF}(x; O, T_i, K_i)$ are computed from Equation (2).

$$f_{IMF}(x; O) = \min_{1 \leq i \leq n_T} f_i(x; O, T_i, K_i) \quad (3)$$

The inaccessibility measure field for a plurality of subtractive tool assemblies at every query point of the design domain ($f_{IMF}(x; O)$) can be calculated as a minimum of an inaccessibility measure for different configurations at which a query point can be removed by a subtractive tool of the subtractive tool assemblies as defined in Equation (3). The configurations over which the minimum is calculated includes at least one of the displacements that bring the sharp points on the subtractive tool in contact with the query point, and the tool orientations that are available to the tool assembly. The inaccessibility measure is defined by a volume of collision between the subtractive tool and an intermediate part design.

There may be challenges in optimizing the build orientation based support accessibility. For example, minimizing volume of support structures is not necessarily the same of minimizing the volume or cost of inaccessible supports, e.g., the volume of inaccessible supports can decrease at a higher overall support volume. Also, calculating large number of build orientations can become time and computationally intensive, thus the analysis needs to be efficient and parallelizable. Another issue to consider when optimizing build orientations is that there are numerous types of support geometries (e.g., beams or tree-like structures) and overhang angles (e.g., between 45° to 90°, inclusive) depending on the AM process. An overhang angle of 90° would allow no extension beyond the lower layer. Also, the cutter's shape in the SM process cannot be ignored. Hence, there is no clear way to assign a correspondence between the translations $t \in \mathbb{R}^3$ and the points $x \in R$ within the near-net shape unless we consider all possible contact configurations and treat boundary points differently from interior points.

Figure 2:
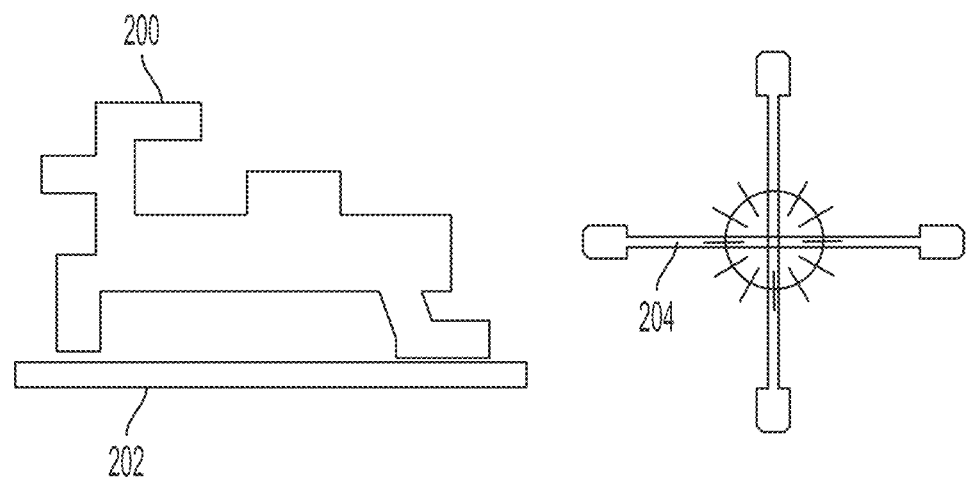
FIG. 2 is a diagram illustrating a simplified part and removal tool used in accessibility analysis according to an example embodiment.
Figure 3:
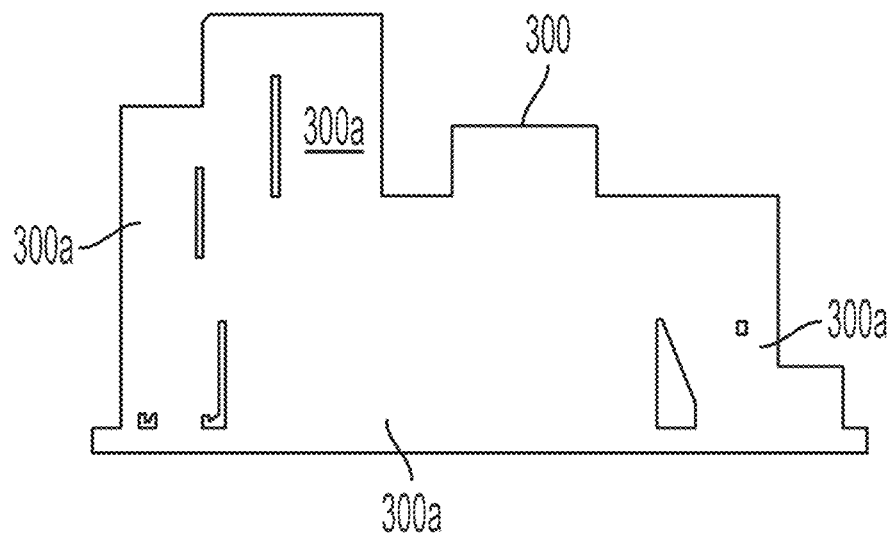
FIG. 3 is a diagram showing the near net shape of part shown in FIG. 2 with supports according to an example embodiment.

When optimizing the build orientation, the tool, substrate, and fixture shapes cannot be ignored in a general setting. Also, the analysis is highly non-linear, meaning a small change in $x \in \mathcal{N}$ can dramatically change the accessibility in a far away point $y \in R$. In FIG. 2, a diagram illustrates a simplified part 200 used in accessibility analysis according to an example embodiment. The part is shown on a build substrate 202 and a removal (e.g., cutting tool) 204 is shown in four different example orientations, 0°, 90°, 180°, and 270°, although may be rotated in any orientation angle in this range. In FIG. 3, a diagram shows the near-net AM part 300 at $\theta_{build}=0°$ with supports 300a. The IMF for the near net shape of part 300 is shown in FIG. 4.

Figure 4:
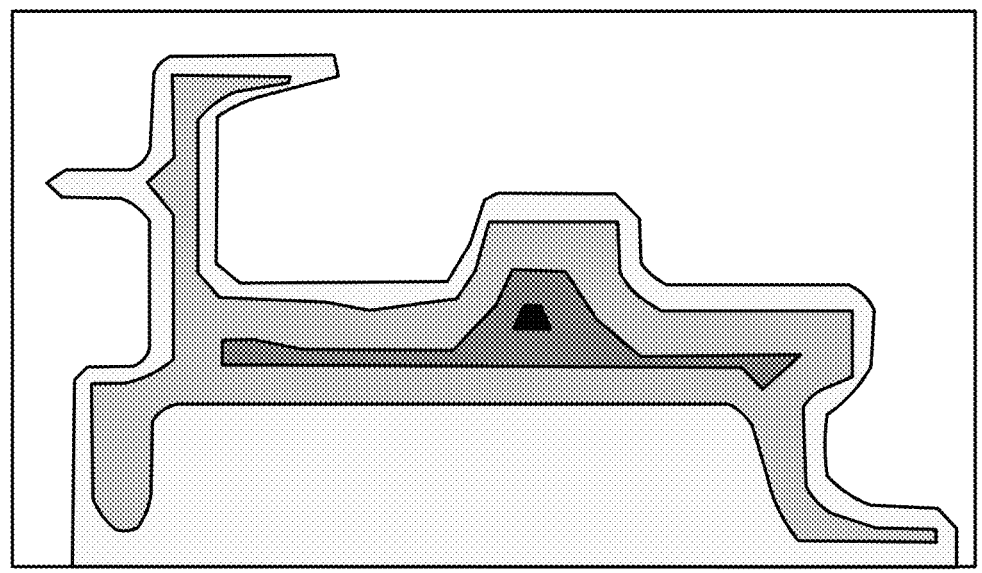
FIGS. 4 and 5 are diagrams showing results of inaccessibility analysis of the shape shown in FIG. 3 according to an example embodiment.
Figure 5:
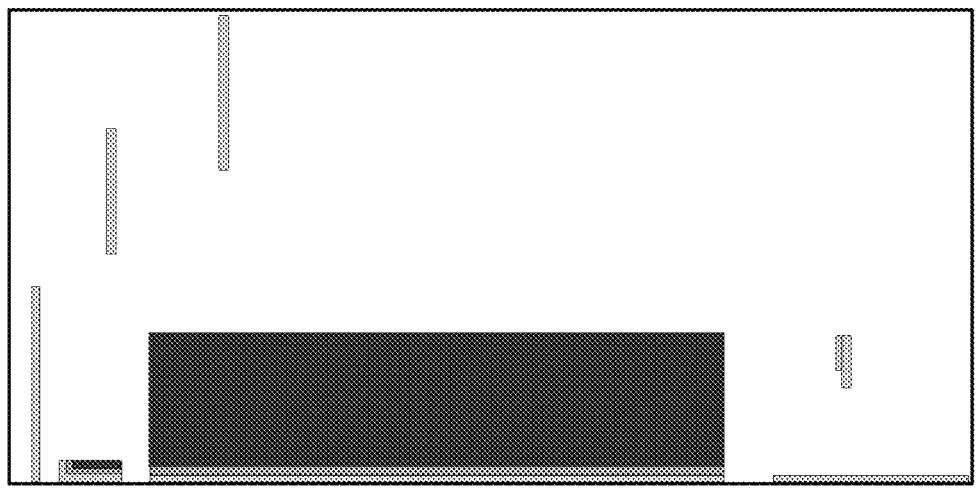
Figure 6:
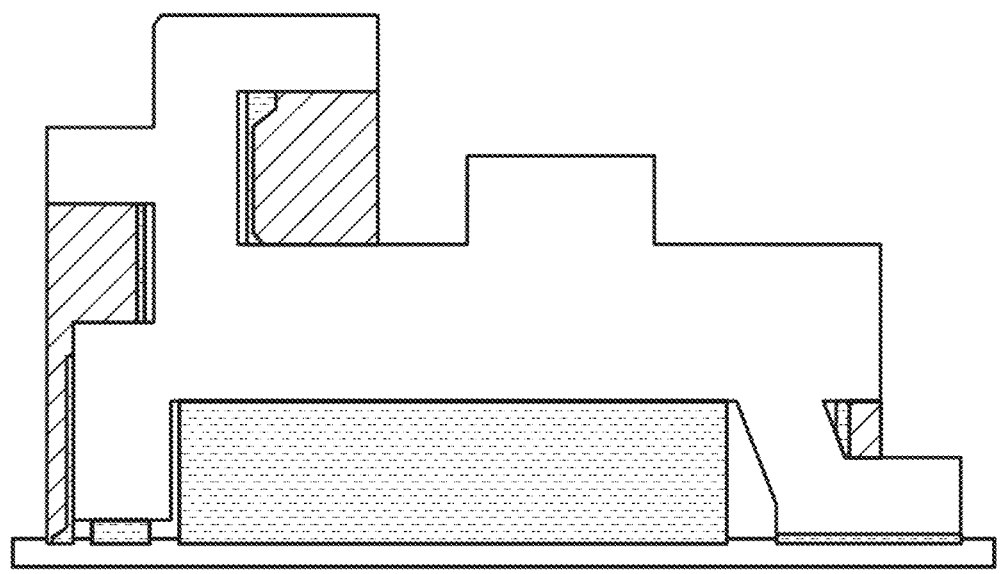
FIGS. 6-9 are diagrams showing accessible and inaccessible supports at different build orientations of the part shown in FIG. 2 according to an example embodiment.
Figure 7:
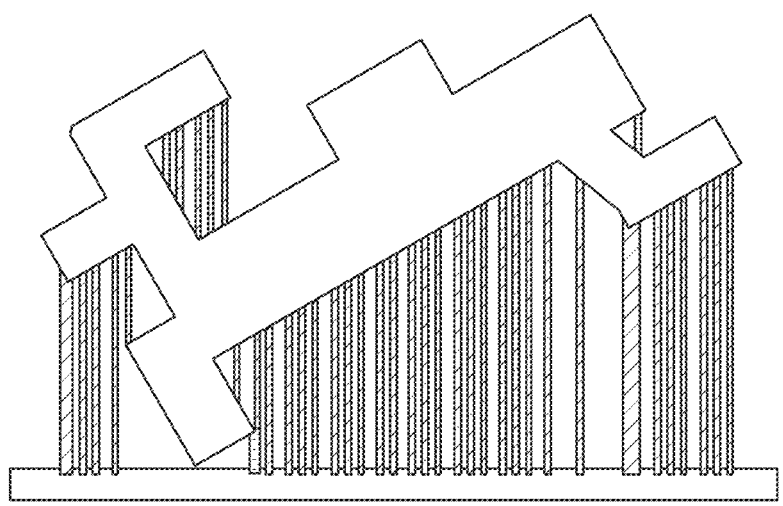
Figure 8:
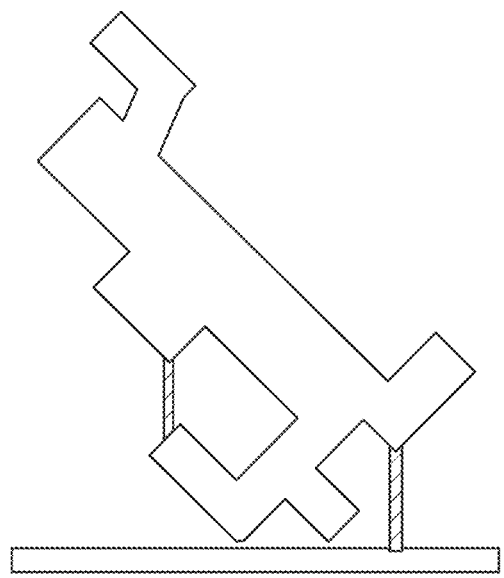
Figure 9:
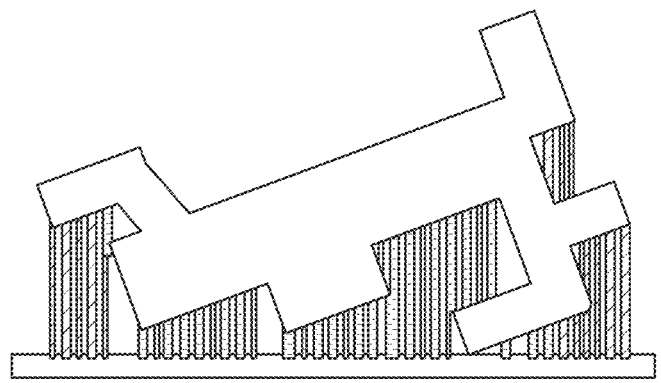

The accessibility analysis for near-net AM part 300 is shown in FIGS. 4 and 5. FIG. 4 is an IMF over the near-net shape and FIG. 5 is the IMF over the supports. The diagrams in FIGS. 6-9 show accessible supports (single hatching) and inaccessible supports (cross-hatching) at orientations 0°, 30°, 135°, 200°, all for 45° overhang angle. For the 135° build orientation (FIG. 8), there are no inaccessible supports. Note that the process parameters some process parameters besides selected tools (e.g., maximum overhang angle, fixture, deposition speed, etc.) can influence the geometry of the supports and their accessibility.

These process parameters may be fixed for each build orientation or be varied together with build orientation and/or tooling. For example, it may be possible to build using a range of overhang angles, with more overhang possibly affecting some quality of the part such as surface smoothness that may or may not be acceptable in some cases. In such a scenario, the overhang angle may be a parameter that is relaxed or optimized together with support accessibility. Another process parameter that can be varied is the selection of different available fixtures that secure the part as it is being manufactured. For example, a larger fixture may be preferred for reasons such as stability, but a smaller fixture may allow more regions of the part and supports to be accessed by an SM tool, although may be less stable and potentially reduce the quality of the finished part.

Figure 10:
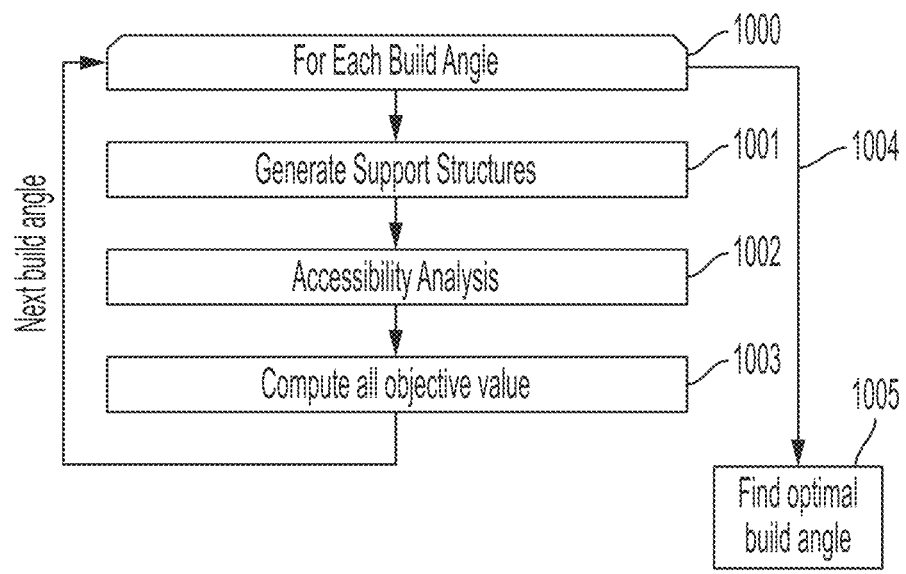
FIG. 10 is a flowchart showing an automated design process according to an example embodiment.

The IMF can be used to set accessibility constraints on support structures. A framework, method, and system can enable automatic build orientation optimization such that the resulting shape is guaranteed to be manufacturable using AM and post-processed using SM processes. At a high level, the proposed automated design process is as shown in FIG. 10. The process involves sampling a number of build angles, in particular build orientations $\Theta_{build} \subseteq SO3$, as indicated by loop limit 1000. For each angle analyzed, support structures are generated 1001, e.g., mathematically modeled using a format compatible with the part geometry. This may involve re-positioning the substrate/fixture relative to the part and generating support structures based on maximum overhang angle and support type (e.g., beams, tree-like, etc.).

After the support structures are generated, an accessibility analysis 1002 is performed. This analysis 1002 may involve constructing the configuration space (C-space) of part, substrate and tool assembly, sampling tool rotations in C-space, and constructing the inaccessibility measure field. After the accessibility analysis 1002, the objective values are calculated 1003. This calculation 1003 may involve, for example, computing volumes of accessible supports and other objective cost functions such as overall support volume, build time, etc. After all angles have been analyzed, block 1000 exits via path 1004, and the optimal build angle is determined 1005, e.g., based on minimizing cost of inaccessible supports, support accessibility and other objectives. In some cases, optimal build angle may not have the minimum cost of inaccessible supports but a reduced cost compared to a non-optimized version. For example, a zero inaccessible support orientation may be possible, but it may have other disadvantages (e.g., total support volume, build quality) such that an orientation is chosen with a still reduced but non-zero inaccessible portions.

These five activities involve understanding of geometric, topological, material, and physical aspects of the available manufacturing capabilities and should not be performed in isolation. Consider the part 200 shown in FIG. 2, where overhang angle $\alpha=45°$ and the set of build orientations $\Theta_{build} \subseteq SO3$ is:

$$\Theta_{build} = \{\theta \in SO3 : \theta = 5n, n \in \mathbb{Z}, 0° \leq \theta \leq 360°\} \quad (4)$$

The multi-axis machining tool 204 is also shown in FIG. 2. The set of tool directions is:

$$\Theta_{tool} = \{\theta \in SO3 : \theta = 10n, n \in \mathbb{Z}, 0° \leq \theta \leq 360°\} \quad (5)$$

Figure 11:
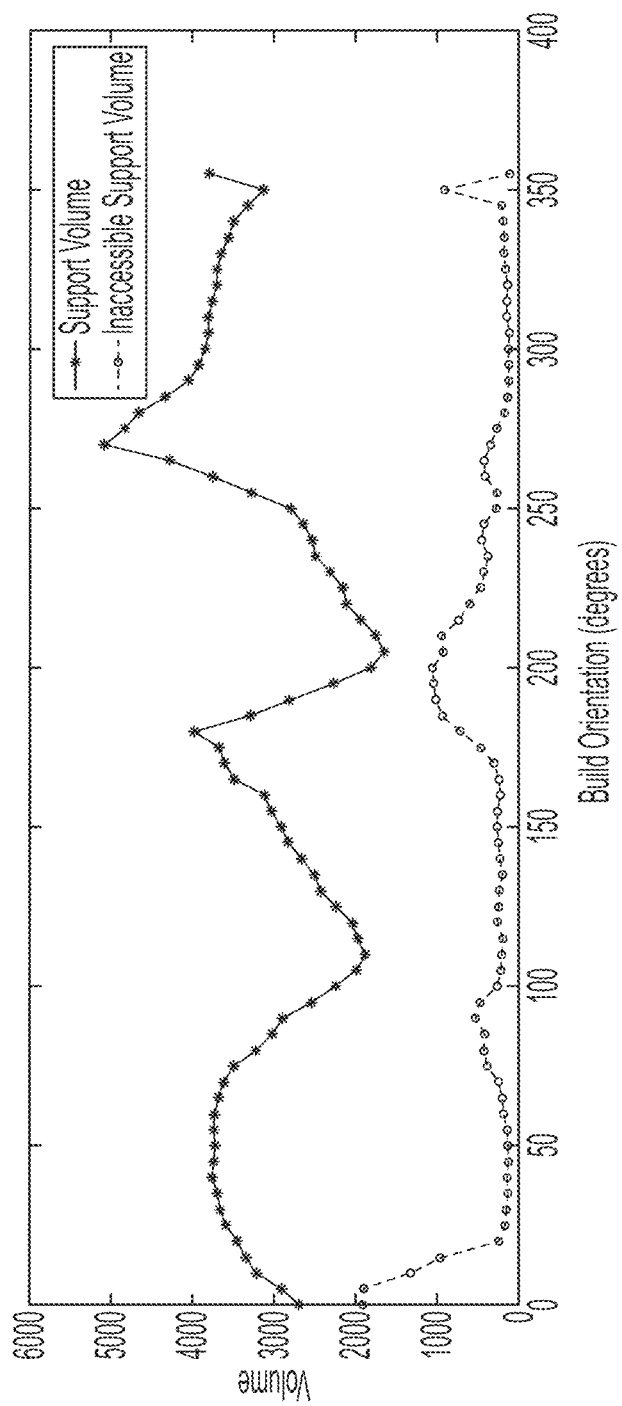
FIG. 11 is a graph showing volume of support and inaccessible supports at different build orientations for a 90° overhang angle according to an example embodiment.
Figure 12:
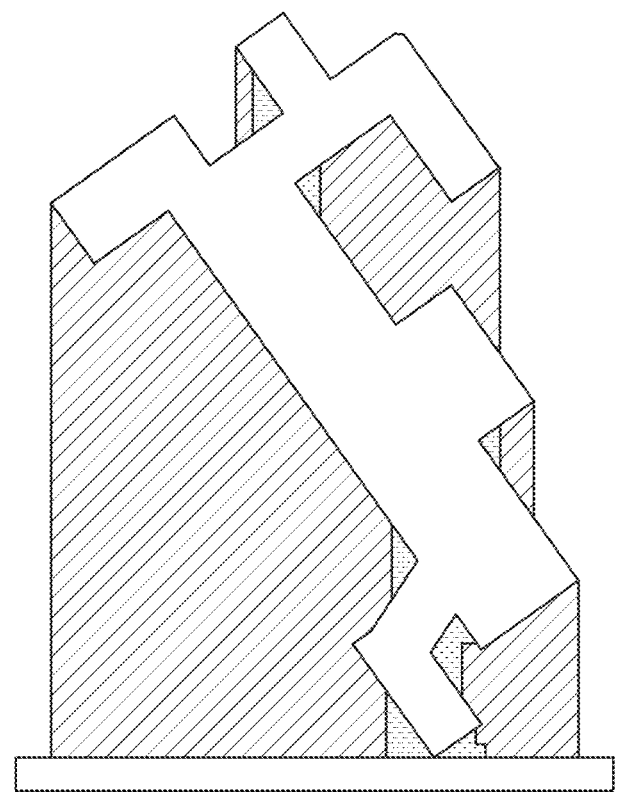
FIG. 12 is a diagram showing accessible and inaccessible supports at a minimal-inaccessible-support orientation of the part shown in FIG. 2 for a 90° overhang angle according to an example embodiment.
Figure 13:
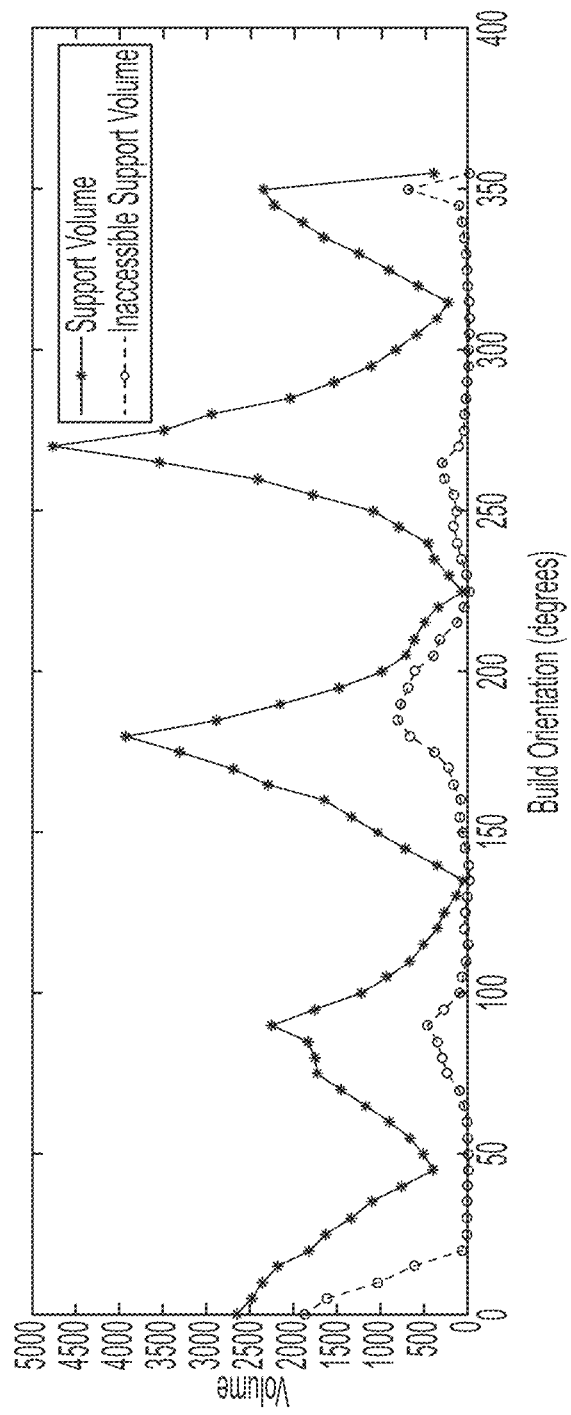
FIG. 13 is a graph showing volume of support and inaccessible supports at different build orientations for a 45° overhang angle according to an example embodiment.
Figure 14:
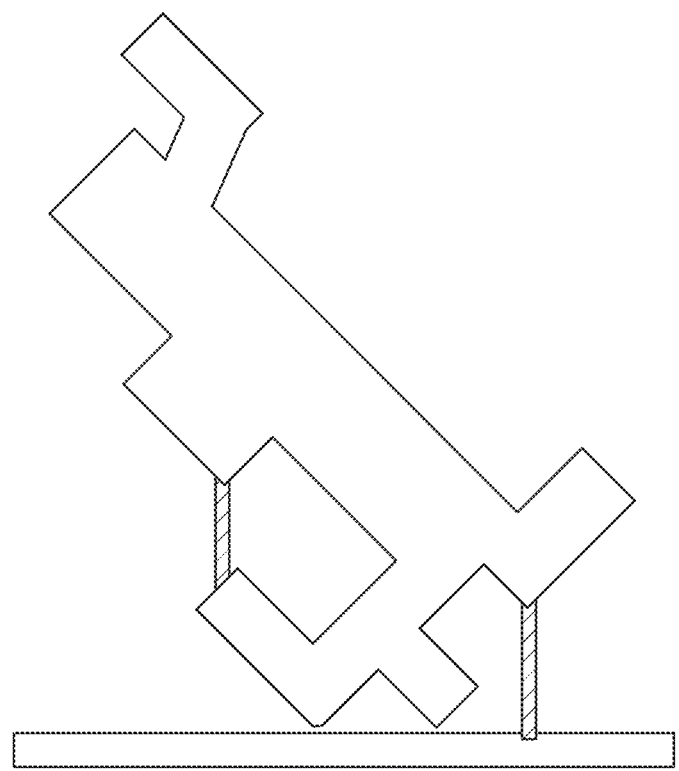
FIG. 14 is a diagram showing accessible and inaccessible supports at a minimal-inaccessible-support orientation of the part shown in FIG. 2 for a 45° overhang angle according to an example embodiment.

The graph in FIG. 11 shows the volume of support and inaccessible supports at different build orientations at a conservative 90° overhang angle. For this example, the cost is assumed to be equivalent to the volume of inaccessible supports, although this example could be adapted to account for other cost measures, e.g., removal tool cost, removal time, etc. There are no orientations with zero inaccessible support volumes. The orientation with minimum inaccessible support volume is $\theta_{build}=305°$. The supports for $\theta_{build}=305°$ are shown in the diagram of FIG. 12. The graph in FIG. 13 shows the volume of support and inaccessible supports at different build orientations at a 45° overhang angle. There are no inaccessible support volumes at build angles 45°, 135°, 225°, 295°, 305°, 310°, 315°. However, the set of orientations with accessible supports can be further optimized based on other competing objectives such as overall cost/volume of all supports. In this case the Pareto-optimal solution is $\theta_{build}=135°$. The supports at $\theta_{build}=135°$ are shown in the diagram of FIG. 14.

Figure 15:
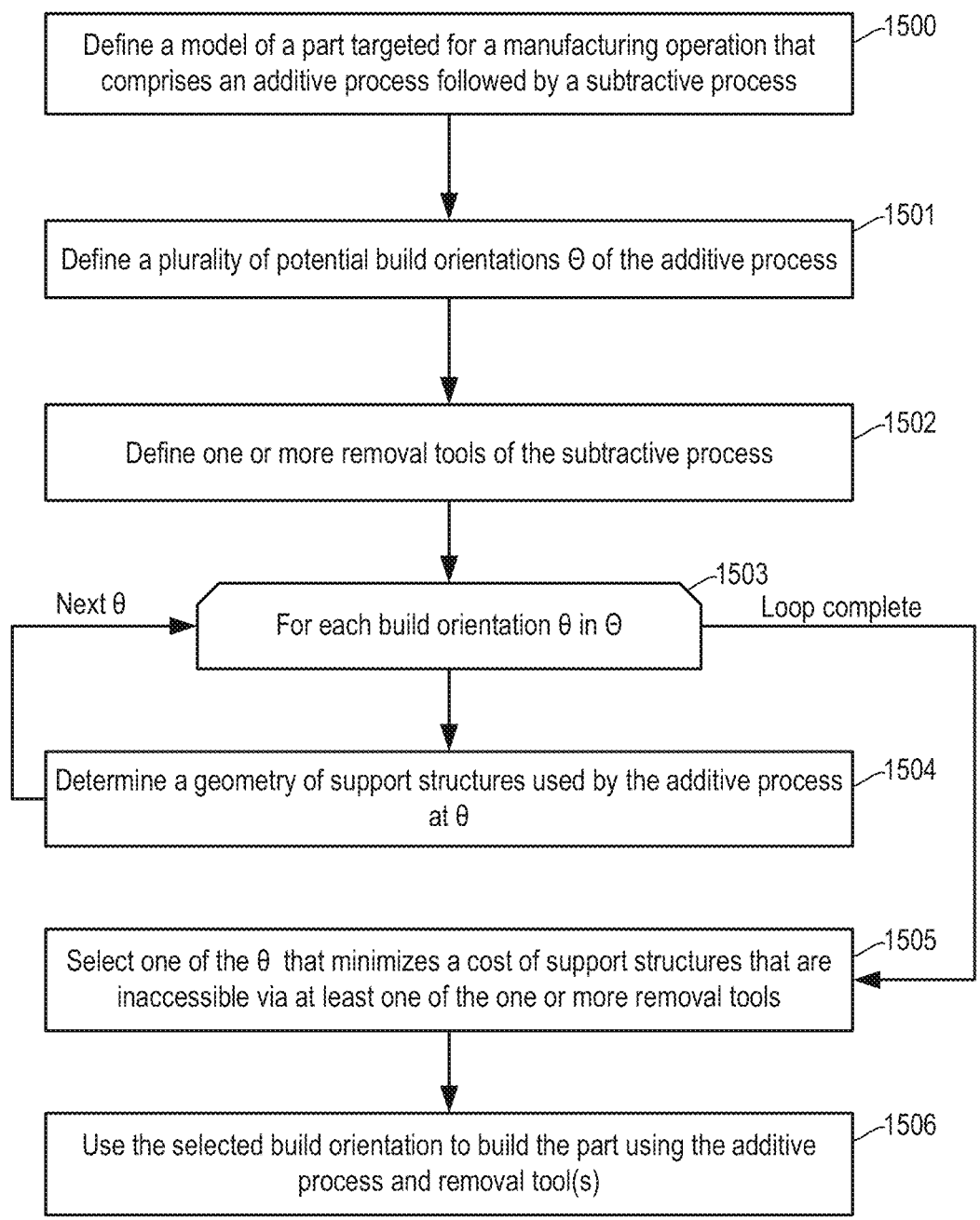
FIG. 15 is a flowchart showing a method according to an example embodiment.

In FIG. 15, a flowchart shows a method according to an example embodiment. The method involves defining 1500 a model of a part targeted for a manufacturing operation that comprises an additive process followed by a subtractive process. The model may define the part's geometry, tolerances, materials, etc. A plurality of potential build orientations of the additive process are defined 1501. One or more tools of the subtractive process are also defined 1502. Block 1503 represents an iteration through each orientation of the plurality of potential build orientations, in which support structures are determined 1504 that that is used by the additive process at the orientation.

One of the plurality of potential build orientations is selected 1505. The selected build orientation has a minimal a cost of portions of the support structures that are inaccessible via the one or more removal tools. Note that the term "minimal" in this context is not necessarily an absolute or global minimum, as it could be a local minimum, Pareto-optimal, etc. Also, depending on the granularity of the build orientations analyzed, the local or global minimum cost may be at an orientation that is not analyzed, and presumably the selected orientation would be have a minimal cost that is near the local or global minimum. The selected build orientation may also be chosen by jointly minimizing other factors in together with the cost of the inaccessible support portions, such as a cost of a selected removal tool, and/or a total volume of the support structures. The selected build orientation is used 1506 to build the part using the additive and subtractive processes.

Figure 16:
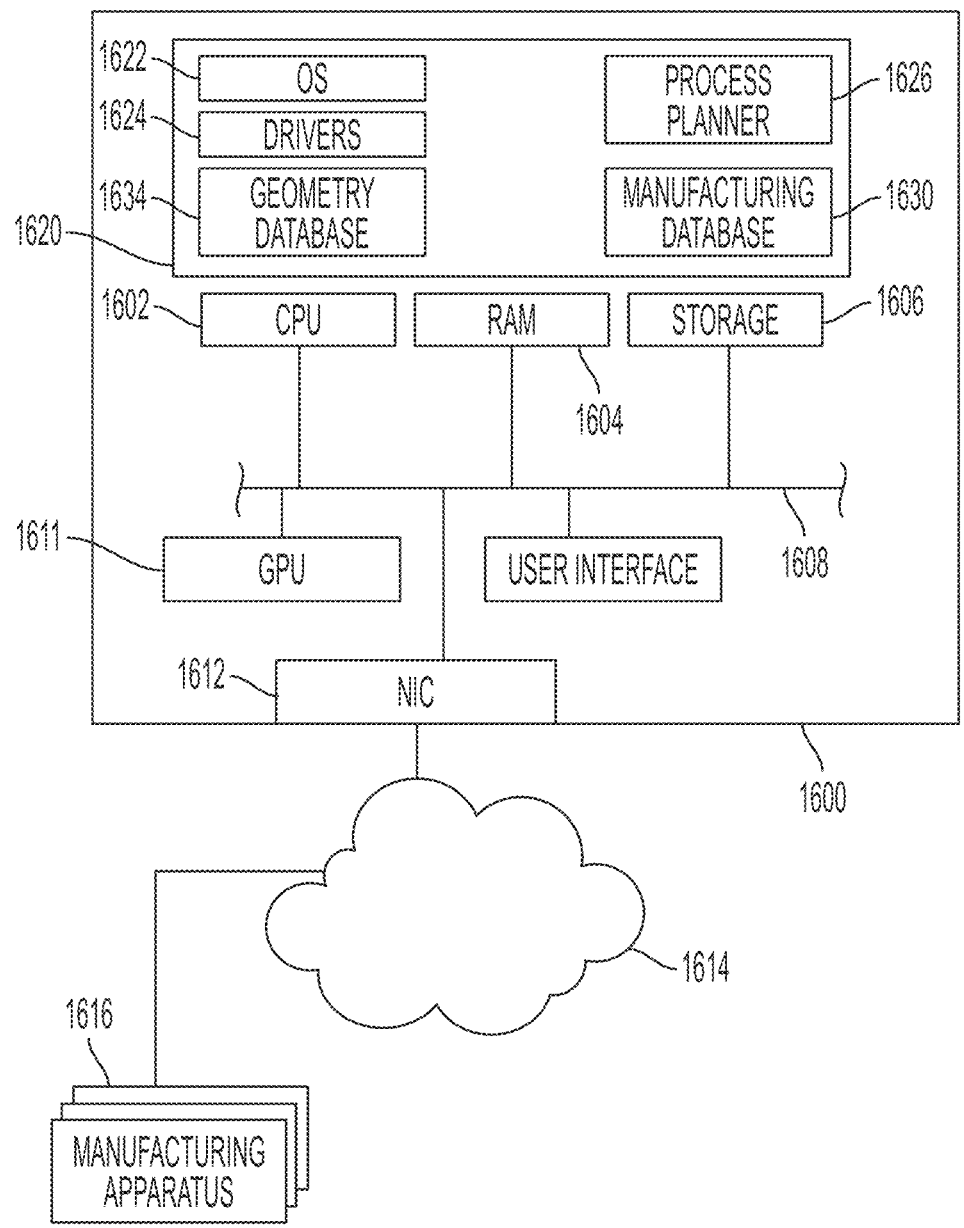
FIG. 16 is a block diagram of a system and apparatus according to an example embodiment.

The methods and processes described above can be implemented on computer hardware, e.g., workstations, servers, as known in the art. In FIG. 16, a block diagram shows a system and computing apparatus 1600 that may be used to implement methods according to an example embodiment. The apparatus 1600 includes one or more processors 1602 such as a central processing unit, co-processor, digital signal processor, etc. The processor 1602 is coupled to memory, which may include both random access memory 1604 and persistent storage 1606, via one or more input/output busses 1608. Other general-purpose or special-purpose hardware may be coupled to the bus 1608, such as graphics processing unit (GPU) 1611 and network interface 1612. Note that the functions of the apparatus 1600 described below may be implemented via multiple devices, e.g., via client-server arrangement, clustered computing, cloud computing, etc.

The network interface 1612 facilitates communications via a network 1614, using wired or wireless media, with two or more manufacturing apparatuses 1616 that can perform AM and SM manufacturing operations. Examples of the manufacturing apparatuses 1616 include 3D printers, selective laser metal sintering machines, computer numeric controlled (CNC) mills, CNC lathes, CNC laser cutters, CNC water cutters, etc. Data may also be transferred to the manufacturing apparatuses 1616 using non-network data transfer interfaces, e.g., via portable data storage drives, point-to-point communication, etc.

The apparatus 1600 includes software 1620 such as an operating system 1622 and drivers 1624 that facilitate communications between user-level programs and the hardware. The software 1620 includes a process planner 1626 that facilitates optimizing an AM build orientation of the part to minimize inaccessible supports that are later removed by an SM process. The inaccessibility of supports may be a sole optimization objective, or may be optimized jointly with other objectives, such as support volume and SM cost. The process planner 1626 interfaces with a geometry database 1634 that includes the part geometry and other factors (e.g., build tolerances, materials, etc.) The process planner 1626 also interfaces with a manufacturing database 1634 that provides information such as tool geometry and costs, fixture geometry, and AM parameters (e.g., allowable overhang angles). The resulting build orientation and SM removal operations can be stored as a process plan, e.g., in a plans database 1630. The plans can be communicated to one or more of the manufacturing apparatuses 1616 to produce parts according to the plans.

The systems and methods described above can automatically optimize the build orientation based on accessibility of support structures. This can be implemented in process planner that can automatically find the best AM process and support generation strategy based on support accessibility. For example, such a planner can automatically find the Pareto-optimal build orientation based on accessibility of support structures and other competing objectives.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method comprising:
   defining a model of a part targeted for manufacturing by an additive process followed by a subtractive process;
   defining a plurality of potential build orientations for the additive process,
   wherein the plurality of the potential build orientations for the additive process are based on a plurality of build angles $\Theta_{build}$ of the part relative to a build substrate or a build fixture, and
   wherein $\Theta_{build} \subseteq SO3$;

defining a set of one or more tools for the subtractive process;

for each orientation of the plurality of potential build orientations, determining support structures for the additive process;

selecting at least one of the plurality of potential build orientations with a minimal cost of portions of the support structures that are inaccessible by the set of one or more tools; and using the at least one selected build orientation to build the part using the additive process and at least one tool in the set of tools for the subtractive process to remove the support structures.

2. The method of claim 1,
wherein the at least one selected build orientation jointly minimizes the cost of the portions of the support structures and a cost of all support structures.

3. The method of claim 2,
wherein the cost is based on a volume of the support structures.

4. The method of claim 1,
wherein the selected build orientation is found using an inaccessibility measure field of the set of one or more tools for the subtractive process, the model of the part and a model of the fixture used to secure the part and the supports during the subtractive process.

5. The method of claim 4, wherein the inaccessibility measure field comprises a continuous spatial field that quantifies to what extent different points in a design domain cannot be accessed by the set of one or more tools for the subtractive process.

6. The method of claim 5, wherein the set of one or more tools comprises a plurality of tools, and wherein the inaccessibility measure field is calculated as a minimum of inaccessibility measure fields for each tool of the plurality of tools.

7. The method of claim 6,
wherein the inaccessibility measure fields for the plurality of tools at every query point of the design domain are calculated as a minimum of inaccessibility measure for different configurations at which a query point can be removed by each tool of the plurality of tools.

8. The method of claim 7, wherein the configurations over which the minimum is calculated comprise at least one of displacements that bring sharp points of the each tool in contact with the query point, and tool orientations that are available to each tool.

9. The method of claim 7, wherein the inaccessibility measure is defined by a volume of collision between each tool and the model of the part and the model of a fixture used to secure the part and the supports during the subtractive process.

10. The method of claim 1, wherein the set of one or more tools comprise two or more tools, the method further comprising for each of the potential build orientations, determining a set of selected tools of the two or more tools, the selected set of tools influencing the cost of the inaccessible portions of the support structures.

11. The method of claim 10, wherein the selected build orientation is further selected based on jointly minimizing a cost associated with the set of tools for the subtractive process and the cost of the inaccessible portions of the support structures.

12. The method of claim 1, further comprising for each of the potential build orientations, determining a selected fixture from a plurality of available fixtures on which to build the part, the selected fixture influencing the cost of the inaccessible portions of the support structures.

13. A method comprising:
defining a manufacturing operation for a part,
the manufacturing operation comprising an additive process followed by a subtractive process,
the subtractive process using a removal tool;
modeling the manufacturing operation for a plurality of potential build orientations of the additive process,
wherein the plurality of the potential build orientations for the additive process are based on a plurality of build angles $\Theta_{build}$ of the part relative to a build substrate or a build fixture, and wherein $\Theta_{build} \subseteq SO3$;
for each orientation of the plurality of potential build orientations, determining supports for the part that are used by the additive process at the orientation;
selecting one of the plurality of potential build orientations that reduces a cost of inaccessible portions of the supports; and
using the selected build orientation to build the part using the additive process and the removal tool of the subtractive process.

14. The method of claim 13, wherein the selected build orientation is found using an inaccessibility measure field of the removal tool, the model, and a model of a fixture used to secure the part and the supports during the subtractive process.

15. The method of claim 14, wherein the inaccessibility measure field comprises a continuous spatial field that quantifies to what extent different points in a design domain cannot be accessed by the removal tool for the subtractive process.

16. The method of claim 13, wherein the removal tool comprises two or more removal tools, the method further comprising for each of the potential build orientations, determining a selected tool of the two or more removal tools, the selected tool influencing a measure of the inaccessible portions of the support structures.

* * * * *